Sept. 21, 1965  J. R. ZIEGLER  3,208,059
GROUNDED WIPER INDICATOR CIRCUIT
Filed July 19, 1962
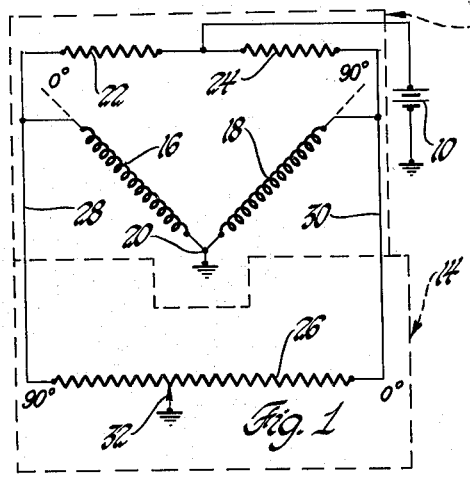
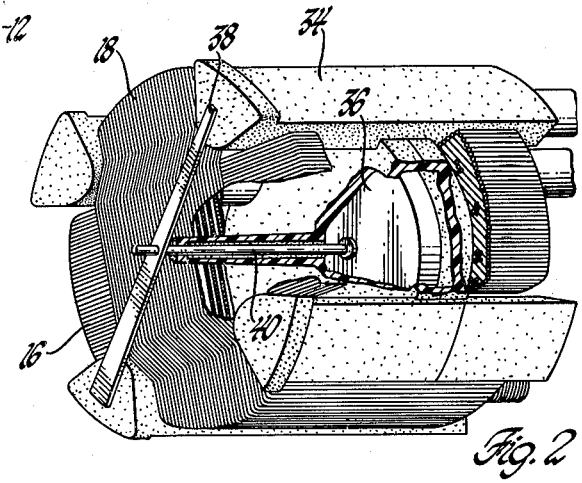
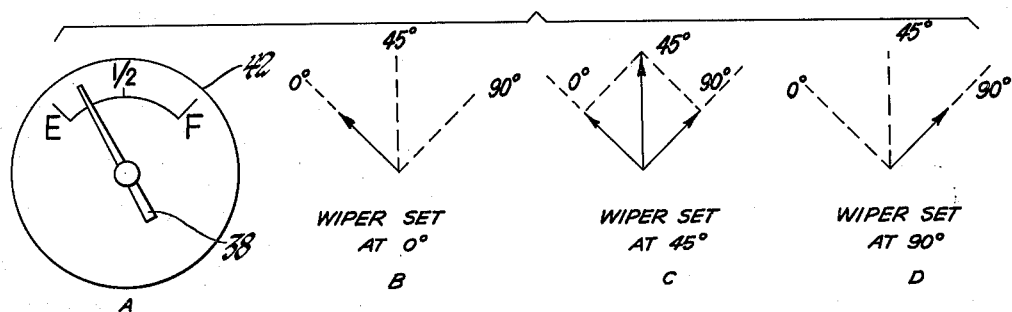
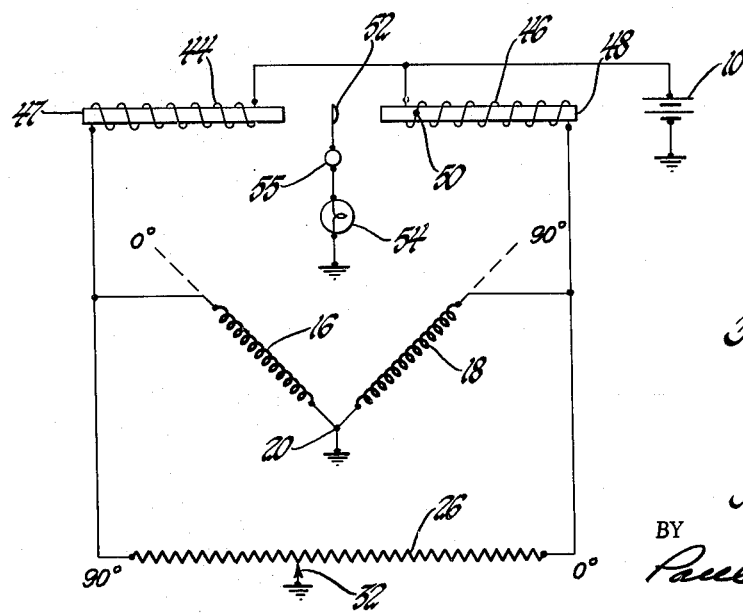
INVENTOR.
John R. Ziegler
BY
Paul J. Ethington
ATTORNEY United States Patent Office
3,208,059
Patented Sept. 21, 1965

3,208,059
GROUNDED WIPER INDICATOR CIRCUIT
John R. Ziegler, Flint, Mich., assignor to General Motors Corporation, Detroit, Mich., a corporation of Delaware
Filed July 19, 1962, Ser. No. 211,060
5 Claims. (Cl. 340—181)

This invention relates to electrical gauges of the type employing electromagnetic deflecting coils and, more particularly, to an improved circuit therefor.

Gauge circuits of the type employing differentially energized electromagnetic deflecting coils are commonly known in the art. In this general type of gauge, a pair of electromagnetic coils are disposed with their axes intersecting at a predetermined angle. The coils are suitably interconnected with a source of D.-C. potential and a potential and a potentiometer arrangement. Where employed to indicate the level of liquid in a container, the changing level of liquid within the container displaces a float-carried potentiometer wiper along a resistive element which is connected across the source of potential. The potentiometer wiper is connected to a common connection of both coils and displacement of the wiper is effective to reciprocally vary the potential of one end of each of the coils with respect to the potential of the other end of each of the coils, thereby varying the respective currents through the coils.

The electromagnetic fields which are produced by the two coils are then differentially varied such that the resultant field is rotated through an angle as determined by the angle between the coils. A permanent magnet rotatably mounted within the joint influence of the deflecting coils will, thus, be displaced through an angle indicative of the change in the amount of liquid in the container.

The present invention relates to a two-wire grounded wiper gauge circuit employing two electromagnetic deflecting coils and exhibits a number of distinct advantages over the previously known gauge circuits. Because of the symmetric nature of the circuit, a high degree of accuracy may be attained by proper selection of circuit components. The inventive circuit configuration also has the advantage of simplicity in the design of the sender unit and the interconnection with the source. Additional advantages are that the differentially energized circuit provided by the present invention is not susceptible to damage due to a reversed connection of the source of potential leads. Such a misconnection results only in a reverse reading gauge and is. therefore, easily detected and corrected. The present circuit is also compatible with auxiliary warning devices, such as low fuel warnings. Due to the differential nature of the circuit, a differential relay may be incorporated into the circuit taking advantage of the presence of existing circuit elements to close an auxiliary warning circuit through the source of potential and the gauge when the ratio currents through the differential legs of the gauge circuit reaches a predetermined value.

These and other advantages of the present circuit will become more apparent upon reading of the following specification taken with the accompanying drawings of which:

FIGURE 1 is a schematic diagram of the basic form of the present invention;

FIGURE 2 is an isometric view of a preferred coil mounting arrangement for the gauge circuit which is partly broken away to expose the rotating parts thereof;

FIGURE 3 is a flux vector diagram of the electromagnetic fields generated by the circuit of FIGURE 1; and FIGURE 4 is a schematic diagram of the inventive circuit showing the incorporation of an auxiliary warning system.

Referring now to FIGURE 1, the basic gauge circuit is shown comprising a source of potential 10 which may be an ordinary automobile battery, a dashboard unit generally designated by reference character 12 and a sender unit 14. The dash unit 12, as indicated in FIGURE 1, is made up of components which would be normally incorporated into a single unit suitable for mounting on the vehicle instrument panel. The particular construction of this unit is shown in FIGURE 2 and further described in the following specification. The sender unit 14 is normally disposed in proximity to the area of the specific conditions to be monitored, i.e., within the vehicle gas tank.

Referring more specifically to the gauge circuit, the dash unit 12 comprises a pair of electromagnetic deflecting coils 16 and 18 which are adapted to produce electromagnetic flux fields along the axes thereof in accordance with the values of current conducted through the respective coils. The coils 16 and 18 are diagrammatically illustrated as having the magnetic axes thereof intersecting at an angle of 90°. However, the circuit operation is not limited to a particular angle. One end of each of the coils 16 and 18 is connected to a point 20 of reference potential shown as ground. Each of the other ends of the coils 16 and 18 is connected through one of a pair of resistors 22 and 24 to the positive terminal of the source 10. Note that the negative terminal of the source 10 is also connected to ground as shown. The resistors 22 and 24 are normally of equal resistance value.

The sender unit 14 comprises a resistor 26 which is connected on one side commonly to coil 16 and resistor 22 by means of electrical conductor 28. This side of the resistor 26 is labeled "90°" in the drawings for reasons which will become more apparent in the following description. The right hand or "0°" side of the resistor 26, as shown in the drawings, is commonly connected to coil 18 and resistor 24 by means of electrical conductor 30. A displaceable contact member 32 is connected to ground and adapted to move along the resistor 26 from one end thereof to the other in accordance with changes in the condition to be monitored. In the event that the gauge is used to monitor liquid level in a tank, it is to be understood that suitable motion transmitting means are to be provided between the liquid in the tank and the contact member 32 and will normally be float operated.

Referring to FIGURE 2, the coils 16 and 18 are shown mounted on a coil form 34 which may be made of a suitable non-conductive material. As diagrammatically shown in FIGURE 1, the coils 16 and 18 are disposed such that the flux axes thereof are mutually perpendicular. It will be noted that the coils 16 and 18 are wound in an interlaced fashion with respect to coil layers. By winding the coils in this manner, the resistance values thereof may be more closely regulated and gauge characteristics become more consistent.

The dash unit 12 of FIGURE 1 may be taken to include the coil form 34 and associated structure to be described below as this entire unit is adapted for mounting on the vehicle instrument panel.

The portion of the dash unit which is shown in FIGURE 2 also includes a rotatably mounted permanent magnet armature 36 which takes the form of a flat round disc of magnetic material which is permanently magnetized with the poles diametrically opposite one another. An indicator needle 38 is affixed to the armature 36 by means of an axle or shaft 40. The needle 38 is used in conjunction with the calibrated dial face 42 indicated in FIGURE 3A. The permanent magnet armature 36 is located in magnetic proximity to the coils 16 and 18 such that the armature 36 will be aligned with the resultant magnetic field produced by the coils 16 and 18. This general type of construction is indicated in the copending applications U.S. S.N. 193,144 and U.S. S.N. 139,145, which are assigned to the assignee of this application.

The flux vector diagrams of FIGURE 3 illustrate how the vectorial resultant of the electromagnetic fields generated by coils 16 and 18 of FIGURE 1 is rotated through an angle of 90° as the contact member 32 is progressed from one end of resistor 26 to the other. The zero degree axis of FIGURES 3B through 3D may be taken to correspond to the flux axis of coil 16 while the 90° axis corresponds to the axis of coil 18. FIGURE 3A shows the calibrated dial face 42 having the indicator needle 38 superimposed thereon. FIGURES 3A through 3D will be further referred to in the following description of operation.

Considering now the operation of the circuit of FIGURE 1, the basic principle involved is one of reciprocally varying the resistances of two substantially parallel electrical circuits through the individual deflecting coils 16 and 18 to thereby rotate the resultant electromagnetic field through an angle substantially equal to the angle between the coils 16 and 18.

With the contact member 32 on the extreme right hand or "0°" position on resistor 26, it can be seen that both sides of coil 18 are connected to the same potential, i.e., ground. The voltage across coil 18 is, thus, zero. However, with the exception of the voltage drop across resistor 22, all of the voltage of source 10 appears across coil 16. Thus, with no current flowing through coil 18 the resultant electromagnetic field will be along the axis of coil 16. This is indicated in FIGURE 3B where the arrow along the 0° axis indicates the direction of the resultant field. It will be now noted that the degree markings on resistor 26 of FIGURE 1 correspond to the degree markings of the flux vector diagrams of FIGURE 3. The indication produced on the calibrated dial face 42 of FIGURE 3A would be an "E" or empty indication, as the permanent armature 36 would be aligned with the resultant electromagnetic field.

With the contact member 32 at the central or 45° position on resistor 26, two substantially equal-resistance conductive paths exist through the gauge circuit from the positive terminal of source 10 to the negative or grounded terminal thereof. The voltage appearing across coil 16 will, thus, be equal to the voltage appearing across coil 18, and the intensities of the electromagnetic fields produced by the coils will be equal. Therefore, the armature 36 will be aligned with a resultant electromagnetic field which bisects the angle between the coils 16 and 18. This is indicated at FIGURE 3C. Referring to FIGURE 3A, it can be seen that the indicator needle 38 will indicate a level of one half on the calibrated dial face 42.

With the contact member 32 on the extreme left hand or 90° end of the resistor 26, the reverse condition from that originally described with respect to the zero position of contact 32 will obtain. That is, both ends of coil 16 will be connected to ground. However, the right hand end of coil 18 as shown in the drawings will be at a potential substantially above ground and, therefore, will have a substantial current flowing therethrough. The resultant electromagnetic field will be completely produced by coil 18 and will be along the axis thereof, as indicated in FIGURE 3C. The corresponding reading on the dial face of FIGURE 3A would be a full indication.

It can thus be seen that by progressing the contact member 32 from one end of the sender resistor 26 to the other, the currents through coils 16 and 18 are differentially distributed. This differential distribution rotates the resultant electromagnetic field produced by the coils through an angle equal to the angle between the coils. Because of the nature of the circuit, the gauge can be seen to be inherently accurate at the zero degree, 45° and 90° positions. By a proper selection of component values the error at the 22.5° and 67.5° positions can be reduced to zero. This can be accomplished by equating the voltages produced across the two effectively parallel paths of the circuit as expressed in terms of circuit elements and the vectorial current relation required to properly locate the resultant flux vector.

Referring now to FIGURE 4, substantially the same circuit is shown as in FIGURE 1. However, this circuit indicates the facility of incorporating an auxiliary warning device such as a low-fuel warning with the basic circuit. In this circuit, electromagnetic deflecting coils 16 and 18 are mutually connected on one side to the point 20 held at ground potential as was previously indicated in FIGURE 1. The coils are also connected on the other side across the sender resistor 26. However, in the circuit of FIGURE 4, the positive terminal on the source 10 is connected to the coils 16 and 18 through a pair of iron core relay coils 44 and 46 respectively. The coils 44 and 46 are respectively wound around, but insulated from the iron cores 47 and 48. The D.-C. resistance of the coils 44 and 46 is comparable to that of resistors 22 and 24 shown in FIGURE 1. Coil 46, in addition to enclosing the iron core 48 is also electrically connected to the core 48 as indicated at point 50. Located adjacent to the iron core 48 is a displaceable relay contact 52 which is connected in series with a warning lamp 54 by means of a suitable conductive pivot 55. The warning lamp 54 is effectively connected to the negative terminal of the source 10 as shown. The relay contact 52 is mechanically biased by means not shown so as to be displaceable only toward the core 48 upon sufficient energization of relay coil 46 relative to the energization of coil 44.

It can be seen from the drawings of FIGURE 4 that with the contact member 32 in the extreme right hand or zero degree position on resistor 26, the total resistance of the parallel path from the positive terminal of source 10 through coil 46 to the contact member 32 has a resistance value which is much less than the other parallel path through relay coil 44 and the parallel combination of coil 16 and resistor 26. Therefore, the current flowing through coil 46 will be much greater than the current through coil 44. This current unbalance will energize coil 46 sufficiently to attract the relay contact 52, thus, completing a circuit from the source 10 through coil 48, contact 52, pivot 55 and the warning lamp 54.

Referring again to FIGURE 3A and B, recall that when the contact member 32 is in the zero position, the distribution of current through the coils 44 and 46 causes the resultant electromagnetic field to be aligned with coil 16, thus, giving an indication of empty on the calibrated dial face 42. Thus, the arrangement of FIGURE 4 provides an auxiliary indication of low fuel in the event the gauge circuit is used as a fuel level indicator. It is to be understood that the sensitivity of the relay arrangement involving coil 46 and contact 52 will be made sufficiently sensitive that the warning lamp 54 will be lighted before the sender contact member 32 has traveled to the extreme zero degree position on the resistor 26.

It is to be understood that while the invention has been described with reference to particular embodiments thereof, it is contemplated that various changes and modifications may be made in the invention and remain within the true scope thereof. For a definition of the invention, reference should be had to the appended claims.

What is claimed is:

1. An electromagnetic indicator circuit for angularly displacing a rotatably mounted magnetic armature in response to changing conditions at a remote point, the circuit comprising the combination of first and second electromagnetic coils relatively disposed such that the magnetic axes thereof intersect at a predetermined angle, first and second impedance elements, a source of potential having one terminal connected to a point of reference potential and the other terminal connected commonly to one side of each of the first and second impedance elements, the first and second coils each having one side connected to the point of reference potential and the other sides being respectively connected to the other sides of the first and second impedance elements, a third impedance element connected across the other sides of the first and second coils, displaceable contact means connected to the point of reference potential and adapted to be displaced along, but in contact with, the third impedance element in response to the changing conditions whereby the voltages impressed across the first and second coils by the source of potential are reciprocally varied, the first and second coils being disposed about the magnetic armature whereby the armature will be aligned with the resultant electromagnetic field from the coils.

2. An electrical gauge for indicating conditions at a remote point comprising the combination of a pair of electromagnetic coils adapted to produce respective electromagnetic fields along the axes thereof in accordance with currents through the coils, the axes of the coils intersecting at a predetermined angle and defining a magnetic plane, a pair of impedance elements of equal D.-C. resistance, a source of potential, one side of each of the impedance elements being connected to one terminal of the source, one side of each of the coils being connected to the other terminal of the source, said other terminal being connected to a point of reference potential, a resistive element located at the remote point, opposite sides of the resistance element being connected to the other side of one of the coils and impedance elements, a displaceable contact member located at the remote point, the contact member being connected to the point of reference potential and adapted to be displaced along and in electrical contact with the resistive element according to changes in the conditions at the remote point, whereby the potentials at the opposite sides of the resistive element are reciprocally varied within a range between the reference potential and the potential of the source, a magnetic armature rotatably mounted in the magnetic plane and adapted to be angularly displaced through a portion of the predetermined angle as determined by the ratio of currents through the coils, and indicating means connected to and rotatable with the armature to indicate the conditions at the remote point.

3. The combination as defined by claim 2 wherein the impedance elements comprise relay coils adapted to be differentially energized by the current from the source according to the displacement of the contact member, the combination also including an auxiliary warning circuit comprising a displaceable relay contact in series with a warning means, the relay contact being normally open circuited but displaceable to complete a circuit with the source, thereby energizing the warning means when the ratio of currents through the relay coils reaches a predetermined value.

4. An electrical gauge for indicating the level of liquid in a container, the gauge comprising a pair of differentially energized coils adapted to produce electromagnetic fields along the respective axes thereof in accordance with currents through the coils, the axes intersecting at a predetermined angle, a source of energizing potential having one terminal connected through respective impedance elements to one side of each of the coils and the other terminal connected to a point of reference potential, the other sides of the coils being connected to the point of reference potential, a potentiometer unit including a resistor having opposite sides connected to said one side of each of the coils, and a contact member connected to the point of reference potential and adapted to displaceably contact the resistor at a point related to the level of liquid in the container thereby differentially varying the currents through the coils, a magnetic armature rotatably mounted in magnetic proximity to the coils and responsive to the electromagnetic fields to be aligned by the resultant thereof, the angular position of the armature being related to the level of liquid in the container.

5. The combination as defined by claim 4 wherein the impedance elements comprise relay coils which are differentially energized by current from the source according to the displacement of the contact member, the combination also including a displaceable relay contact normally open circuited but adapted to close a circuit through the source when the ratio of currents through the relay coils reaches a predetermined value, warning means in circuit with the relay contact and adapted to give an auxiliary warning when the circuit therethrough is completed.

References Cited by the Examiner

UNITED STATES PATENTS

| 1,681,314 | 8/28 | Vawter | 73—301 |
| 2,483,266 | 9/49 | De Giers. | |
| 2,848,657 | 8/58 | Fisher | 317—155.5 X |
| 2,931,225 | 4/60 | Plueger | 73—301 X |

FOREIGN PATENTS

| 309,449 | 7/33 | Italy. |
| 404,558 | 1/34 | Great Britain. |
| 623,637 | 5/49 | Great Britain. |
| 1,001,621 | 1/57 | Germany. |

NEIL C. READ, *Primary Examiner.*